(12) United States Patent
Nimbavikar et al.

(10) Patent No.: US 10,498,892 B2
(45) Date of Patent: *Dec. 3, 2019

(54) OPTIMIZED CALL HANDLING DURING E911 CALLS

(71) Applicant: T-Mobile USA, Inc., Bellevue, WA (US)

(72) Inventors: Gunjan Nimbavikar, Bellevue, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,287

(22) Filed: Jul. 31, 2017

(65) Prior Publication Data
US 2019/0037075 A1 Jan. 31, 2019

Related U.S. Application Data

(60) Provisional application No. 62/476,367, filed on Mar. 24, 2017.

(51) Int. Cl.
*H04M 3/51* (2006.01)
*H04M 3/533* (2006.01)
(Continued)

(52) U.S. Cl.
CPC ....... *H04M 3/5116* (2013.01); *H04M 3/4288* (2013.01); *H04M 3/436* (2013.01); *H04M 3/5335* (2013.01); *H04M 3/42068* (2013.01)

(58) Field of Classification Search
CPC ............ H04M 3/5116; H04M 3/5335; H04M 3/42068; H04M 3/436; H04M 3/42059
See application file for complete search history.

(56) References Cited

U.S. PATENT DOCUMENTS 6,359,970 B1 * 3/2002 Burgess .................. H04L 47/10
379/142.01
8,244,204 B1 * 8/2012 Chen .................. H04M 3/42195
379/114.28

(Continued)

OTHER PUBLICATIONS

Office Action for U.S. Appl. No. 15/665,272, dated Jan. 25, 2018, Chiang, Guard Timer to Optimize E911 Call Handling, 9 pages.

(Continued)

*Primary Examiner* — Asghar H Bilgrami
(74) *Attorney, Agent, or Firm* — Lee & Hayes, P.C.

(57) ABSTRACT

Systems and methods for improved e911 call handling. The system enables users to create multiple categories of callers. When a user makes a 911 (emergency) call, different categories of users receive different treatment. A call from a public safety access point (PSAP), for example, can be routed to the user's user equipment (UE). A caller on a favorites list may also receive the same, or similar, treatment. General callers, on the other hand, can be sent directly to voicemail, as is currently the practice for all callers. The system can enable certain callers to be sent to the UE to activate call-waiting, even though the user is on an emergency call, rather than being sent to voicemail with no explanation. The system can be used to provide this service to family members, healthcare professionals, PSAPs, and other important callers.

20 Claims, 7 Drawing Sheets

(51) Int. Cl.
*H04M 3/42* (2006.01)
*H04M 3/436* (2006.01)
*H04M 3/428* (2006.01)

(56) References Cited

U.S. PATENT DOCUMENTS

| | | | |
|---|---|---|---|
| 8,588,375 B1* | 11/2013 | Shashindranath | H04W 4/90 |
| | | | 379/46 |
| 8,848,878 B2* | 9/2014 | Peddie | H04M 3/42195 |
| | | | 379/210.01 |
| 8,965,325 B2 | 2/2015 | Li et al. | |
| 9,513,867 B1* | 12/2016 | Tokunaga | G06F 3/165 |
| 10,084,914 B1 | 9/2018 | Chiang et al. | |
| 2002/0141559 A1* | 10/2002 | Gurgun | H04M 3/428 |
| | | | 379/215.01 |
| 2003/0191676 A1 | 10/2003 | Templeton | |
| 2005/0096008 A1 | 5/2005 | Shin | |
| 2005/0243974 A1* | 11/2005 | Pearson | H04L 47/10 |
| | | | 379/142.01 |
| 2007/0041516 A1 | 2/2007 | Dickinson | |
| 2007/0116233 A1 | 5/2007 | Onorato | |
| 2008/0214141 A1 | 9/2008 | Burdick et al. | |
| 2008/0305763 A1 | 12/2008 | Wijayanathan et al. | |
| 2010/0261492 A1* | 10/2010 | Salafia | H04M 3/42068 |
| | | | 455/466 |
| 2010/0316208 A1* | 12/2010 | Langos | H04M 3/428 |
| | | | 379/207.05 |
| 2011/0026440 A1 | 2/2011 | Dunn et al. | |
| 2013/0045708 A1 | 2/2013 | Nguyen et al. | |
| 2013/0333020 A1* | 12/2013 | Deshpande | G06F 21/36 |
| | | | 726/16 |
| 2014/0199957 A1 | 7/2014 | Hursey et al. | |
| 2016/0269549 A1 | 9/2016 | Chandra | |
| 2016/0278132 A1* | 9/2016 | Baek | H04W 4/90 |
| 2018/0097934 A1 | 4/2018 | Yalamanchili | |
| 2018/0278747 A1 | 9/2018 | Chiang et al. | |
| 2018/0302450 A1 | 10/2018 | Nimbavikar et al. | |
| 2018/0375996 A1 | 12/2018 | Chiang et al. | |

OTHER PUBLICATIONS

Office action for U.S. Appl. No. 15/665,287, dated May 14, 2018, Nimbavikar, "Optimized Call Handling During E911 Calls", 11 page.
PCT Search Report and Written Opinion dated Jul. 30, 2018, for PCT Application No. PCT/US18/23720, 14 pages.
Technical Specification, "3GPP TS 26.267 V14.0.0", 3GPP A Global Initiative, dated Mar. 17, 2017, retrieved from : https://portal.3gpp.org/desktopmodules/Specifications/SpecificationDetails.aspx?specificationId=1445 . Section 4.1, figure 1, 37 pages.
PCT Search Report and Written Opinion dated Oct. 31, 2018 for PCT Application No. PCT/US18/43336, 12 pages.
Office Action for U.S. Appl. No. 16/119,767, dated May 31, 2019, Chiang, "Guard Timer to Optimize E911 Call Handling", 8 pages.
Office action for U.S. Appl. No. 15/665,250, dated Jun. 5, 2019, Nimbavikar, "Systems and Methods for Improved E911 Call Handling", 19 pages.

\* cited by examiner

OPTIMIZED CALL HANDLING DURING E911 CALLS

CROSS REFERENCE TO RELATED APPLICATIONS AND PRIORITY CLAIM

This Application is a non-provisional of, and claims priority under 35 USC § 119(e) to, U.S. Provisional Patent Application No. 62/476,367, filed Mar. 24, 2017, entitled, "E911 Call Waiting."

BACKGROUND

The enhanced 911 (e911) service was developed in response to the increasingly mobile nature of modern communications. e911 enables a user to dial 911 and be connected to the appropriate emergency services regardless of their location. Obviously, a cellular caller who hails from Atlanta, Ga., but calls 911 while they are in New York City, N.Y. does not want to be connected to emergency services in Atlanta. To this end, some enhancements were needed to enable callers to be connected to local emergency services based on their location, as opposed to their home location.

Currently, if a user dials 911 from a cellular or internet protocol (IP) based communications device (e.g., a cell phone, smart phone, laptop, tablet, etc.), they are routed to local emergency services using the location provided by the cell tower or wireless router to which they are connected. Due to the somewhat limited range of both of these communications methods, the location provided is generally specific enough for routing purposes. In other words, in most cases, the area covered by a particular cell tower, for example, is also covered by a single, or a small number of, emergency service providers.

When a user dials 911, however, the user is generally unable to receive calls or call-waiting notification all calls are automatically rejected by the user equipment (UE) and/or the network. In addition, no explanation is provided to incoming callers as to why the call was rejected. Generally, the call simply goes immediately to voicemail.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
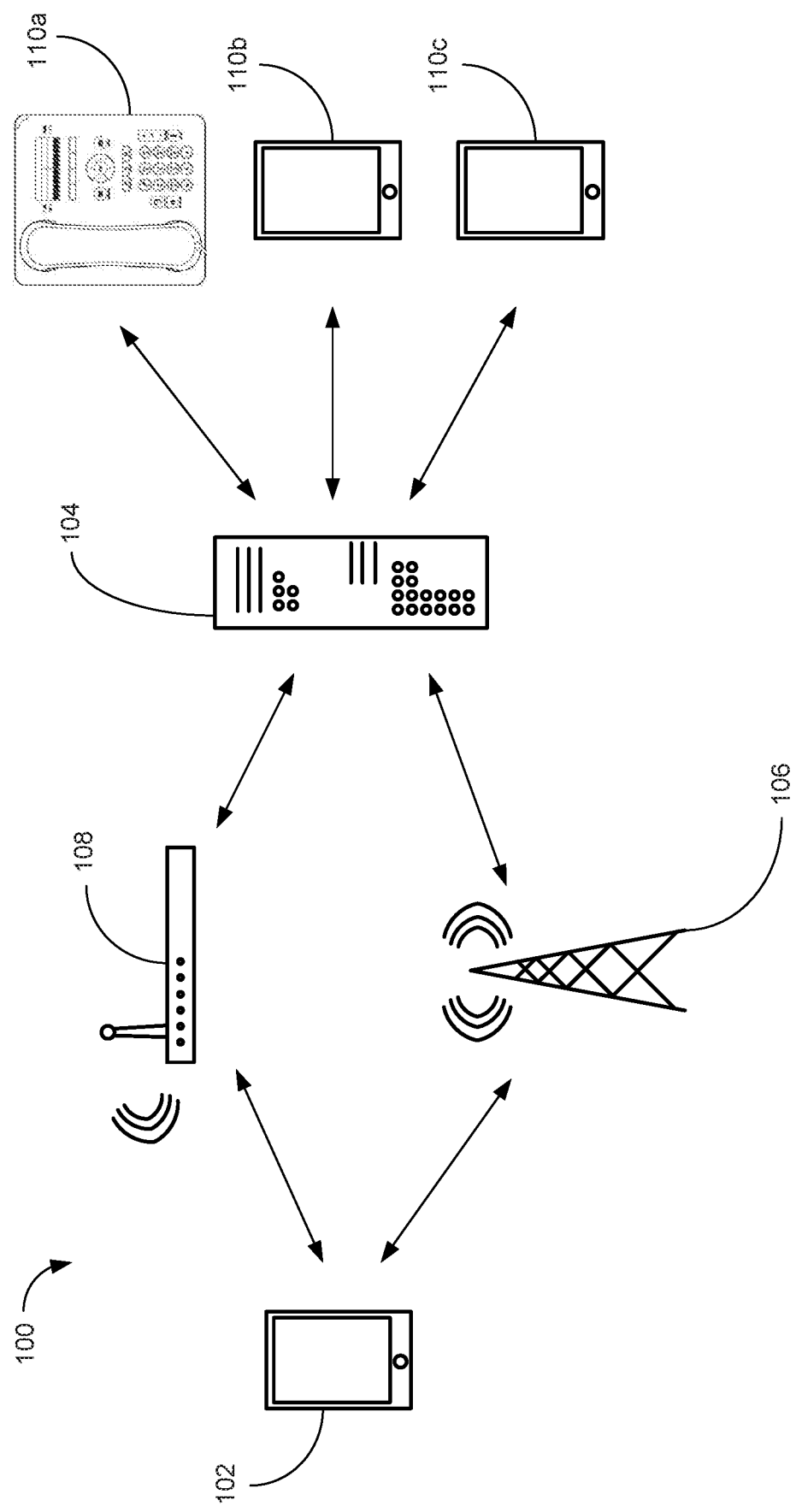
FIG. 1 depicts an example of a system for optimized call handling during enhanced 911 (e911) calls including a user equipment (UE) connected to an Internet Protocol Multimedia Core Network Subsystem ("IMS") with multiple caller categories, in accordance with some examples of the present disclosure.

As mentioned above, currently, when a user dials 911 from a device that utilizes enhanced 911 (e911) services such as, for example, a cell phone, smart phone, laptop, or tablet computer, that devices cannot simultaneously receive another call. In other words, in an effort to protect users from distractions during an emergency, the user equipment (UE) and/or network disables call-waiting and/or other features. If a caller calls the user during an e911 call, therefore, the caller is simply sent straight to voice-mail.

This feature can prevent users from being distracted during a 911 call. This can also prevent users from accidentally hanging up on emergency services during a 911 call as they try to switch between the incoming call and the 911 call. Unfortunately, with no explanation, sending the caller directly to voicemail may be perceived by the caller as a slight. In other words, the caller may assume that they have been sent to voicemail due to the user hitting the "reject call" button. There may be times, however, where the user would like to receive an important call even though they are on a 911 call.

One example is when a user calls a public safety answering point (PSAP) i.e., the entity that is called when the user dials 911 and hangs up or is disconnected. The user may then redial the PSAP in an attempt to complete the call. In the meantime, based on the previous call from the user, the PSAP may attempt to call the user back. In this case, it would be convenient for the user to be able to hang up the second 911 call and take the incoming call from the PSAP. This can avoid both (1) the delay associated with calling the PSAP on the second call and (2) the redundancy of two emergency operators connected with the same caller on two different lines.

In a similar scenario, a user may call his doctor in an emergency situation with which the doctor is already familiar (e.g., a heart condition). When the call goes unanswered, the user may then dial 911. If, while the user is on the call with 911, the doctor calls back, it would be useful to notify the user to this fact. The user may be able to hang up with 911 and speak to the doctor, which may enable a more efficient resolution of the pending emergency. The doctor may be able to recommend a dosage change, or other solution, to at least temporarily resolve the issue.

A user may call 911 to report a missing child. Obviously, if the child calls the user during the 911 call, it would be beneficial for the user to receive that call. This would obviously be a relief for the parent of a missing child, but can also prevent emergency resources from being unnecessarily committed. The user could simply receive the call from the child and "cancel" the report to 911.

To this end, it would be useful for call-waiting (and perhaps other features) to be enabled at least for PSAPs. In some examples, it may also be useful to enable the user to maintain a "preferred" caller list for whom call-waiting is also active even when the user is on a 911 call. The preferred caller list can comprise, for example, health care practitioner, family members, close friends and neighbors, etc. It is to such systems and methods that examples of the present disclosure of primarily directed.

Example of the present disclosure, therefore, can comprise a system 100 to enable call-waiting to be enabled for certain callers when a user is on an e911 call rather than just being sent to voicemail or disconnected. As shown, the UE 102 can connect to the Internet Protocol Multimedia Core Network Subsystem ("IMS") 104 via one or more cell towers 106 (for a cellular call) or a wireless router 108 (for an internet protocol, or IP, call), among other things. As mentioned above, however, when the UE 102 is connected on an e911 call, the UE 102 is generally unable to receive calls and call-waiting is inactive. This intended to prevent the user from accidentally hanging up in the emergency call, or otherwise be distracted during an emergency.

For some users, however, it may be desirable to inform the user (via the UE 102) that the caller is a PSAP or a preferred caller to enable the user to accept the incoming call, if desired. In the example above, if the caller is redialing 911 and the incoming call is the PSAP calling back, for example, the user may wish to hang-up on the current call to take the incoming call from the PSAP. Thus, the user is connected directly to the PSAP, saving the time of waiting for another operator on the second 911 call, and the PSAP is saved from having two operators connected to the same user at the same time.

In some cases, whether call-waiting is active, or not, during a 911 call can be a function of the UE 102. In other words, an application or the operating system (OS) of the UE 102 can include a feature that detects when the user dials 911, disables call-waiting in general, and enables call-waiting only for PSAPs and/or preferred callers. Thus, when a caller 110 calls during an e911 call, the UE 102 can automatically either send the caller 110 to voicemail or activate call-waiting, for example, depending on the category of the caller. Thus, a telemarketer can be sent to voicemail, while call-waiting can be activated for the user's cardiologist.

In other examples, call-waiting functionality can be controlled by the IMS 104. A number of "back-end" components of the IMS 104 could be responsible for determining the status of a caller 110 and then activating call-waiting as appropriate. In some examples, the mobile switching center (MSC), which handles end-to-end connections anyway, could be used to check caller lists and route the call directly to voicemail or to the UE with a code (e.g., a session initiation protocol (SIP) code) to trigger call-waiting on the UE 102. In other words, because the MSC generally handles routing for voice calls, the MSC may already be aware that the user has dialed 911. Thus, the MSC can detect that the user has dialed 911, check the caller against the PSAP and/or preferred list of callers, and then act accordingly.

In other examples, the system 100 can be a function of a telephone application server (TAS). In some examples, when a user dials 911, the TAS can receive a message (e.g., a SIP message) indicating that the UE 102 is connected to a PSAP. If a user receives a call during this time, the TAS can compare the caller to one or more lists of callers (e.g., PSAP, preferred, VIP, and general). While the user is connected to the PSAP, therefore, only calls on one of the approved lists (e.g., PSAP and preferred) cause the call-waiting on the UE 102 to be activated. Other callers (e.g., general and VIP) are sent to voicemail, as usual.

It should be noted that, at present, there is no SIP message that enables the UE 102 to inform the network that the UE 102 is on a 911 call. The closest facsimile is the generic 486 code that merely indicates that the UE 102 is "busy." The call-handling (i.e., sending calls to voicemail) while the UE 102 is on a 911 call is, for example, generally handled by the UE 102. The network simply routes the call to the UE 102 as per normal.

To this end, examples of the present disclosure also include a new, updated SIP response code or SIP header that indicates the UE 102 is on a 911 call. Thus, in some examples, the SIP message can include the standard 486 "busy" code, but also include a header (e.g., "911") indicating the UE 102 is busy because the UE 102 is on a 911 call. In other examples, a separate, new, currently unused, SIP response code (e.g., 475) can be used to indicate that the UE 102 is on a 911 call.

When the UE 102 disconnects from the PSAP, the TAS can receive a second message enabling call-waiting to its normal operation (i.e., all calls can invoke call-waiting). Of course, other components of the IMS 104 such as the Third-Generation Partnership Project (3GPP) Authentication, Authorization, and Accounting (AAA), home location register (HLR), or home subscriber serve (HSS), among others could also include this feature.

In some examples, as shown in FIG. 1, callers 110 can be divided into a plurality of tranches. So, for example, the callers 110 can comprise public safety answering points (PSAPs) in a first category 110a, preferred caller in a second category 110b, and all other callers in a third, "general," category 110c. In a scenario where a user calls 911, hangs up, and then calls 911 again, for example, an operator may call the UE 102 back based on the first call (where the user hung-up). In this scenario, it may be useful to enable the call from the PSAP operator to go through to call-waiting on the UE 102. In this manner, the user may be able to hang up on the second 911 call which may be on hold or in queue and answer the incoming call from the PSAP operator. This enables the user to be connected to the PSAP 110a more quickly and clears a call from the queue at the PSAP 110a at the same time.

The user may also wish to save a preferred caller list, VIP caller list, or other call lists on the UE 102 (or the IMS 104) to receive "special" treatment when the user is on an e911 call. So, for example, the user may include family members and healthcare practitioners, in the second category 110b. Thus, as discussed above, if the user's cardiologist calls during a 911 call, rather than being unceremoniously sent to voicemail, the call-waiting on the UE 102 can alert the user to the incoming call and to the identity of the caller. The user's cardiologist, for example, may be able to give faster, more specific, guidance than a PSAP operator who is completely unfamiliar with the user's medical history.

Of course, depending on the situation, the user may choose to accept the incoming call and place the current call on hold, accept the incoming call and hang up the current call, or reject the incoming call. If a user dials 911 to report a missing child, for example, the user is not likely to accept a call from their cardiologist even though the call is on a the "approved" list. A user on the second 911 call (discussed above) that receives a call from his cardiologist, on the other hand, may accept the call from the cardiologist and either place the 911 call on hold or disconnect from it. The user's cardiologist may insist that the user hang up and dial 911, for example. In this case, the user can simply switch back to the second 911 call already on hold.

In some examples, the system 100 can include a plurality of lists of callers in each category. In other words, similar to a "favorites" list on current UEs, which may enable one-touch dialing or other features—a list for each category 110a, 110b, 110c of caller 110 can be stored on the UE 102 or on a network entity. When a caller calls the UE 102, the UE 102 or the network entity can refer to the plurality of lists and take the appropriate action.

Thus, the PSAP 110*a* category can include a list of local numbers for emergency providers (e.g., police, fire, emergency medical services (EMS), etc.) that are likely to call back in an emergency. In other words, when a caller dials 911, the PSAP 110*a* routes the call to the appropriate emergency service. When a PSAP 110*a* calls the user back, however, the PSAP 110*a* is general calling from a local number. Thus, the caller ID, for example, for the call from the PSAP 110*a* is not "911," but some local phone number. Thus, the first category 110*a* can include all local numbers for PSAPs in, for example, the county, city, area, state, or region.

Similarly, the second category 110*b* can include family members, favorites, VIPs, or other callers from whom the user wishes to receive call-waiting notifications even when the user is on an emergency call. As mentioned above, the second category can include health care providers, the user's spouse, children, or parents, girlfriend or boyfriend, etc. To this end, the second category 110*b* may be made up of multiple lists e.g., a family list, a healthcare list, and a VIP list each of which is approved for "special" treatment.

Figure 2:
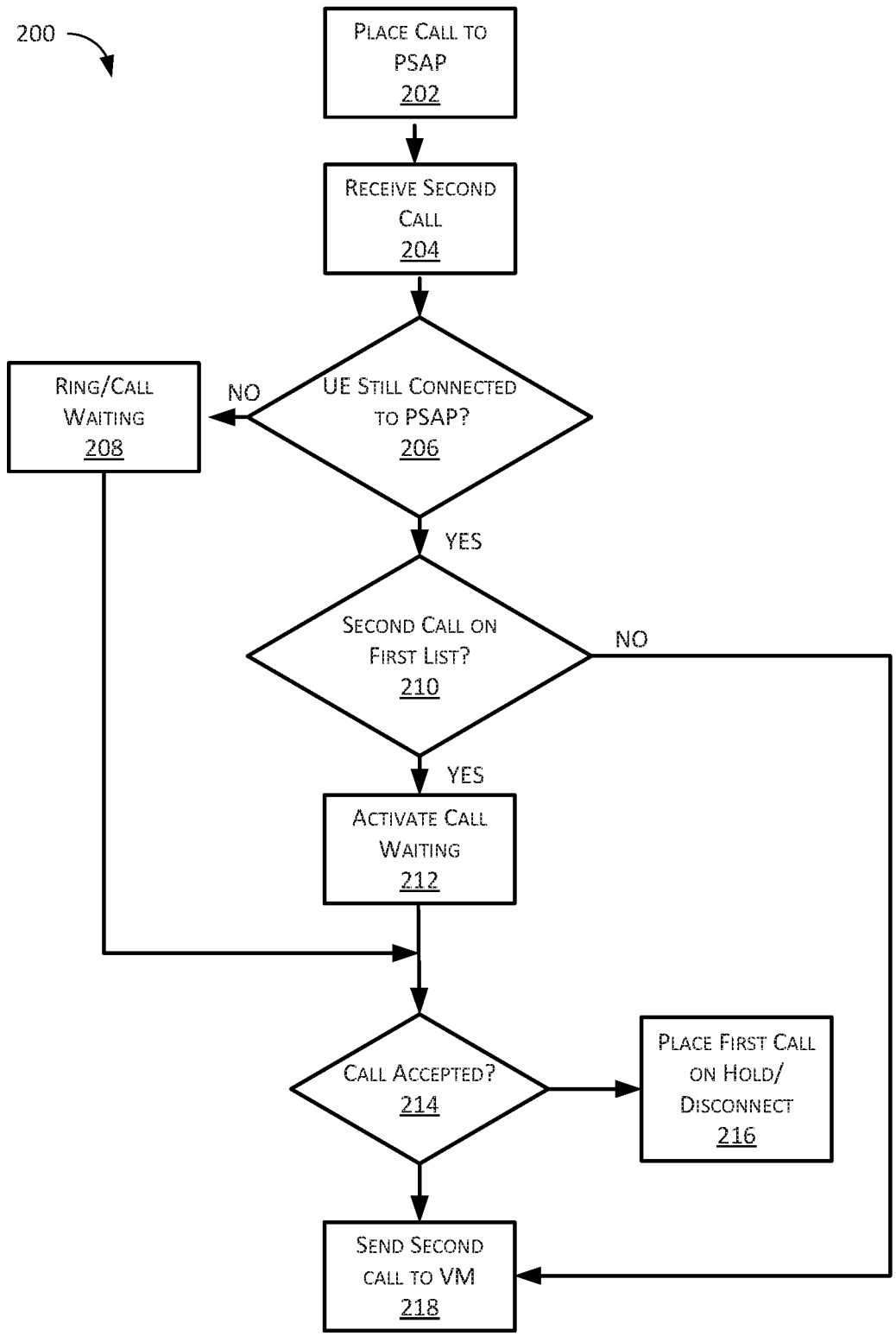
FIG. 2 is a flowchart depicting an example of a method for optimized call handling during e911 calls on the UE, in accordance with some examples of the present disclosure.

As mentioned above, the system 100 can be carried out primarily on the UE 102 or primarily on the IMS 104. To this end, as shown in FIG. 2, examples of the present disclosure can comprise a method 200 for providing optimized call handling during an e911 call that is carried out primarily on the UE 102. In this configuration, an application ("app"), the OS, or other software on the UE 102 can monitor calls and activate or deactivate call-waiting, as necessary. Thus, rather than simply sending a caller 110 to voicemail, some, or all, callers 110 can be put through to call-waiting to enable the user to choose whether to take the call, or not.

At 202, the UE 102 can place a first call to a PSAP 110*a*. In the US, regardless of how the user places the call (e.g., cell phone, landline, tablet, etc.), this is generally achieved by dialing 911. In the UK, this is generally achieved by dialing 999. Other countries may use other codes or sequences. Regardless, as mentioned above, dialing 911, for example, currently activates special call handling, where all incoming calls are rejected.

What happens to the call depends largely on the configuration of the IMS 104 and the UE 102. If the IMS 104 employs network-based voicemail, for example, the UE 102 simply rejects the call because it is on a 911 call. The network, however, simply sees this as a call that was not answered and may simply let the call ring, send the call to voicemail, or forward the call to another number (call-forwarding). If, on the other hand, the IMS 104 incorporates UE-side voicemail, the UE 102 will generally either reject the call (the call just rings) or the calls is sent directly to voicemail. Thus, the UE 102 essentially enters "do not disturb" mode automatically.

In contrast, dialing 911 in this case can invoke the method 200 for providing optimized call handling during an e911 call, described herein. Thus, the user dialing 911 activates the app or script responsible for monitoring incoming calls and taking an appropriate action. The app can use a listening function, for example to detect when the dialer on the UE 102 dials 911. In other examples, the app can monitor the transceiver to detect when the UE 102 connects to a PSAP.

At 204, the UE 102 can receive a second call at the transceiver. Conventionally, with the UE 102 connected to the PSAP 110*a*, the UE 102 (or the network) would simply send the second call to voicemail. In this case, a "general" caller can still be handled in the manner. Preferred callers on the other hand can activate call-waiting to give the user the option to take the call. In this manner, the user is not distracted by a telemarketer or business call, for example, during an emergency, but may receive calls from family members, PSAPs, and other relevant callers.

At 206, the UE 102 can determine that the user is still connected to the PSAP 110*a*. In other words, it is possible that shortly after the second call was received, the user hung up with the PSAP 110*a*. In this case, at 208, the second call can be handled in the normal manner. In other words, the UE 102 can ring or activate call-waiting as appropriate. In some examples, the UE 102 can wait two or three rings before proceeding in case the user hangs up from the emergency call.

At 210, if the UE 102 is still connected to the PSAP 110*a*, on the other hand, the app can determine if the second call is on a preferred list. In other words, the app, or the UE 102, can store at least two different lists contacts that are to be provided with optimized call handling during an e911 call and contacts that are to be sent to voicemail in the normal manner. Thus, as mentioned above, the first list can actually include more than one list, but is generally populated with numbers associated with PSAPs 110*a*, "favorites," and/or "VIPs," (collectively, "preferred callers" or the "preferred list").

The list associated with PSAP 110*a* can include local numbers for emergency services in the area. This can include police, fire, EMTs, emergency rooms (ERs), poison control, and other authorities. The list associated with PSAP 110*a* as may also be used in areas without 911 services. In other words, in some remote areas and/or areas in the developing world, a user may be required to dial the actual number of the local PSAP 110*a* to reach emergency services. In either case, the app can include a "white list" of numbers associated with local PSAPs 110*a*.

The app can also contain a user created list of favorites VIPs, or other preferred callers. As mentioned above, the user can include anyone the user wishes to receive optimized call handling during an e911 call. This may include, for example, family, close friends, roommates, and healthcare providers, among other things. Thus, in some examples, the "white list" can also include the favorites and/or VIPs. Indeed, the "white list" can include anyone the user chooses to add. In some examples, this can include the existing favorite contacts list included on some UEs 102 that enables users to utilize one-touch dialing and other features.

In some examples, the first list can also include the last number, or last several numbers, dialed by the user prior to calling the PSAP 110*a*. As mentioned above, the user may first attempt to call a doctor and then call the PSAP. If the doctor is not stored in the UE 102 (e.g., the user looked up the number on the Internet), however, then the doctor obviously is not included in a favorites or a VIP list. To this end, the first list can include the last call, last three calls, last five calls, or some other number of calls dialed by the UE 102 prior to dialing the PSAP 110*a*.

At 212, if the second call is on the first list, the app can activate call-waiting for the second call only. As normal, the call-waiting can include the name and/or number of the caller. In some cases, because the second call may be coming from a PSAP 110*a* calling from an unknown local number, all incoming PSAP calls can include a code or message (e.g., a SIP message) that causes the user to display "911," "PSAP," "Emergency Services," or some other indication of who is calling. Of course, this is somewhat redundant, because the user knows that any call coming through during an emergency call is already on the preferred list. It may nonetheless be useful, however, to enable the user to decide whether to take the call, or not.

At 214, the method 200 (e.g., an app) can determine if the user accepted the call or rejected the call (or simply let it go to voicemail). At 216, if the user chose to accept the incoming call, then the normal call-waiting functions can be available to the user. In other words, the user can choose to take the second call and place the first call on hold or hang up the first call. If the user is a family member, the user may wish to switch over, leaving the 911 call on hold, quickly tell the family member what is going on, and the switch immediately back to the 911 call hopefully in an effort not to miss the PSAP operator.

At 218, if, on the other hand, the caller 110 is not on the first list, or the user rejects the second call or lets it go to voicemail, the caller 110 can be sent to voicemail to enable the caller to leave a message. Thus, ultimately, the caller ends up in voicemail; however, the user has at least been provided with the opportunity to answer calls from those callers on the preferred list. In either case, the caller can leave a message as normal. Of course, this assumes that the user has configured voicemail. If not, the call may simply ring, receive a recorded message, or disconnect.

Figure 3:
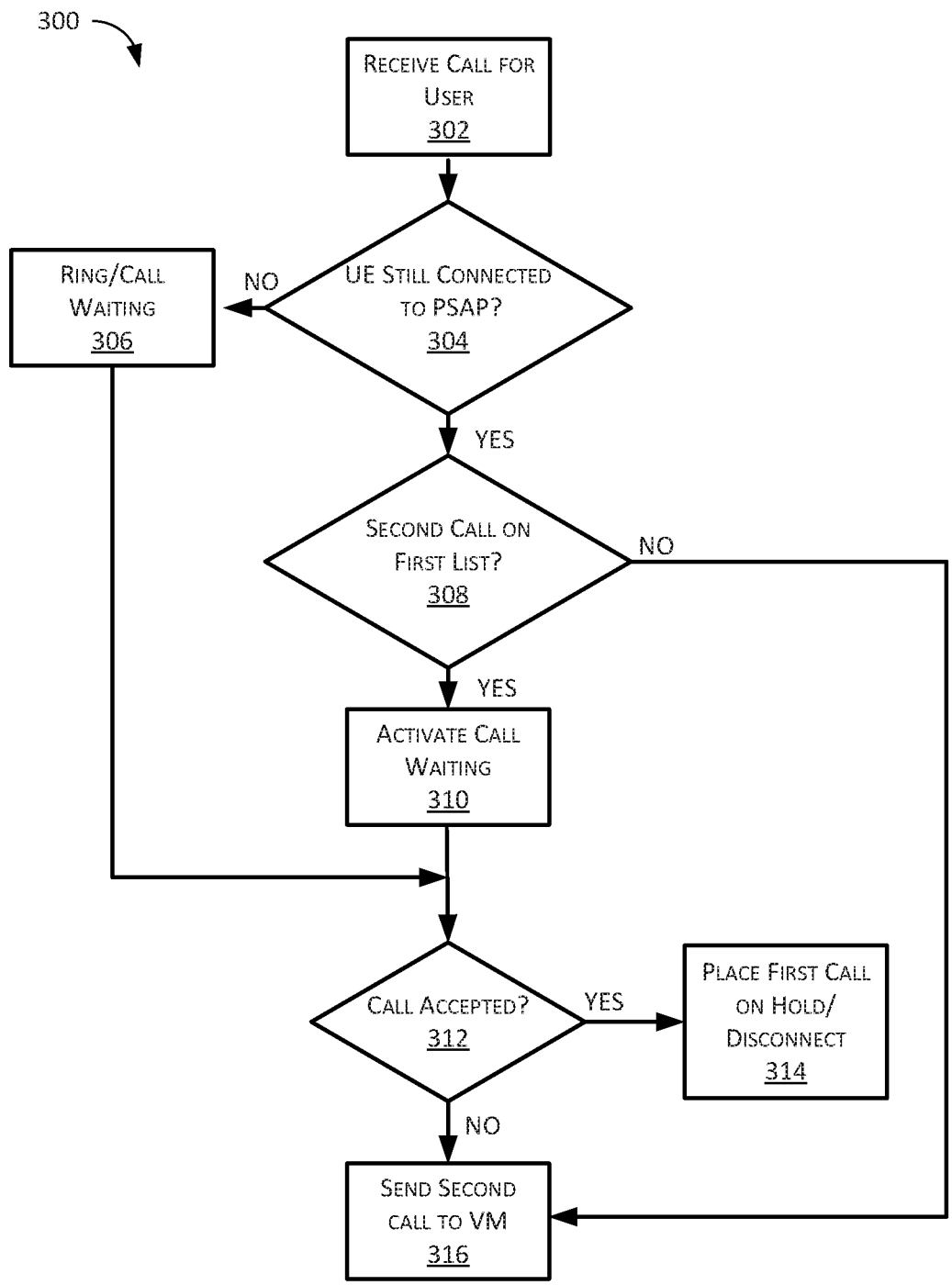
FIG. 3 is a flowchart depicting an example of a method for optimized call handling during e911 calls on the IMS, in accordance with some examples of the present disclosure.

Similarly, as shown in FIG. 3, examples of the present disclosure can also comprise a method 300 for providing enhanced e911 call handling on a network entity associated with the IMS 104. Thus, rather than being handled by an app, and storing various lists, on the UE 102, some or all of these functions can be handled by a server associated with the telecommunications network. The network entity can comprise, for example, a TAS, 3GPP AAA server, HLR, HSS, or other "back end" server. Indeed, due to its interconnected nature, many components of the IMS 104 could be responsible for handling some, or all, of the steps of the method 300. A network database server could be responsible for storing the call lists, for example, while a different network entity handled call monitoring and routing. Thus, the method 300 is similar to the method discussed above, but handled on the network side, rather than the UE 102.

To this end, at 302, the IMS 104 can receive a call for the UE 102 from a caller 110. Normally, the IMS 104 would simply route the call to the UE 102 and, if the UE 102 were on an emergency call, the UE 102 would automatically send the call to voicemail. At 304, in this case, however, the IMS 104 can determine if the UE 102 is connected to a PSAP 110a. Thus, a component of the IMS 104, such as the TAS, which manages calls for the UE 102, can include a "white list" of PSAP numbers. This can include 911 or 999, as appropriate, of course, but may also contain local numbers associated with PSAPs 110a. Thus, by comparing the number to which the UE 102 is currently connected to the white list on the network entity, the IMS 104 can determine that the UE 102 is currently being used for an emergency call.

At 306, if the UE 102 is no longer connected to the PSAP 110a, the call can be handled in the normal manner. Thus, if the user hung up at the same, or nearly the same, time as the call is received, then the call can be routed to the UE 102 as normal. In some examples, the network entity may include a predetermined delay to determine if the UE 102 disconnects from the PSAP 110a. In other words, if the UE 102 disconnects from the PSAP 110a within two or three rings, for example, the call can be routed to the UE 102.

At 308, if the UE 102 is still connected to the PSAP 110a, on the other hand, the network entity can determine if the call is on a first list. In other words, the IMS 104 can store at least two different lists contacts that are to be provided with enhanced e911 call handing and contacts that are to be sent to voicemail in the normal manner. Thus, as mentioned above, the first list can actually include more than one list, but is generally populated with numbers associated with PSAPs 110a and "favorites" or "VIPs," among other things. Indeed, the user can choose any caller they would like to include for enhanced e911 call handling.

At 310, if the second call is on the first list, the network entity can send the call through to the UE 102, activating call-waiting in the normal manner. Thus, the user is given the opportunity to accept or reject the call even though they are on an emergency call. To this end, the white list may only include callers that the user deems rise to this level (e.g., family members, close friends, spouses, etc.).

At 312, the network entity can determine if the user accepted the call or not. All things being equal, it is probably more likely that the user would not accept the call while on an emergency call, when compared to a regular call. Certain callers (e.g., the caller's doctor), however, may prompt the user to answer the call and place the PSAP 110a on hold or hang up with the PSAP 110a.

To this end, at 314, the user can have the normal choices to place the emergency call on hold or to hang up. The user may wish to switch over to the second call briefly to give a loved one an update and then switch back to the emergency call. In some examples, the caller may be better equipped to help the user than the PSAP operator. In this case, the user can simply hang up the emergency call and take the second call.

At 316, if, on the other hand the caller 110 is not on the first list, or if the user rejects the call, the caller 110 can be sent to voicemail to enable the caller 110 to leave a message. Thus, the user has the choice to answer the call or remain on the emergency call depending on circumstances. If the user is on hold, for example, the user may choose to answer the call. If the user is actively speaking with a PSAP operator, on the other hand, the user may choose to let the caller 110 go to voicemail. In the case of a general caller 110c, however, the user is not given the choice i.e., the general caller 110c is sent straight to voicemail as normal.

Of course, not all callers are on a list associated with the UE 102. Users receive calls from unknown numbers all the time. A call may be from someone known to the user, but from an unfamiliar work number, for example, or a hotel. A call may be from a telemarketer or a company to which the user has never spoken. Regardless, in some examples, the general caller 110c can simply be a number unknown to the user and/or not stored on the UE 102.

Figure 4:
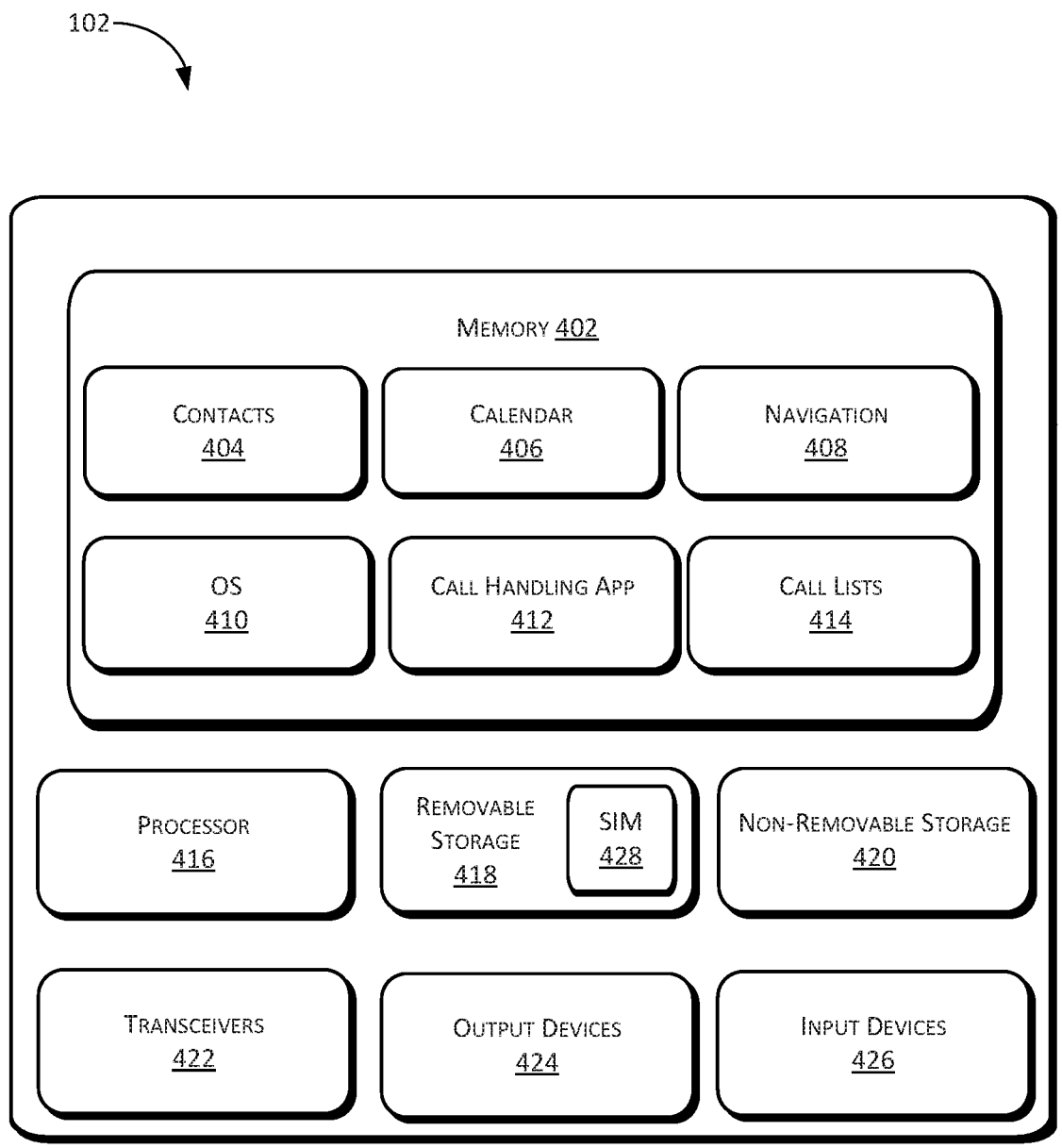
FIG. 4 is an example of a UE for use with the systems and methods disclosed herein, in accordance with some examples of the present disclosure.

As shown in FIG. 4, the system 100 and methods 200, 300 can be used in conjunction with a UE 102 that can comprise a variety of electronic devices. For clarity, the UE 102 is described herein generally as a cell phone or smart phone. One of skill in the art will recognize, however, that the system 100 and methods 200, 300 can also be used with a variety of other electronic devices, such as, for example, tablet computers, laptops, desktops, and other network (e.g., cellular or IP network) connected devices from which a 911 call can be placed. These devices are referred to collectively as UEs 102.

The UEs 102 can comprise a number of components to execute the above-mentioned functions and apps. As discussed below, the UEs 102 can comprise memory 402 including many common features such as, for example, the contacts 404, calendar 406, navigation software 408, and the operating system (OS) 410. In this case, the memory 402 can also store a call-handling app 412 and one or more call lists 414.

The UEs 102 can also comprise one or more processors 416. In some implementations, the processor(s) 416 is a central processing unit (CPU), a graphics processing unit (GPU), or both CPU and GPU, or any other sort of processing unit. The UEs 102 can also include one or more of removable storage 418, non-removable storage 420, transceiver(s) 422, output device(s) 424, and input device(s) 426. In some examples, such as for cellular communication devices, the UEs 102 can also include a subscriber identification module (SIM) 428 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408, 412, 414 and the OS 410 for the UEs 102, among other things.

The memory 402 can also comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 102 and currently comprises, for example, iOS 10.3.2 for Apple products and Nougat for Android products. The OS 410 contains the modules and software that supports a computer's basic functions, such as scheduling tasks, executing applications, and controlling peripherals.

As mentioned above, the UE can also include a call-handling module, or app 412. The call-handling app 412 can perform some or all of the functions discussed above with respect to the method 200 for call handling on the UE 102 (as opposed to the method 300 on the IMS 104). Thus, the call-handling app 412 can also have access to one or more call lists 414 stored in the memory 402. Thus, the call-handling app 412 can be activated when the user dials 911, for example, or can have a listening function that monitors the transceiver(s) 422, for example, and activates when 911 is dialed (or a local PSAP 110*a*, if applicable).

Thus, the call-handling app 412 can determine that the UE 102 has dialed 911, for example, and then await incoming calls. If an incoming call comes in during the 911 call, the call-handling app 412 can consult the one or more call lists 414 to determine if the incoming call should be sent to voicemail or the user. If the incoming call is on the white list, for example, the call-handling app 412 can activate call-waiting to enable the user to accept, reject, or simply ignore the incoming call.

The UEs 102 may also include additional data storage devices (removable and/or non-removable) such as, for example, magnetic disks, optical disks, or tape. Such additional storage is illustrated in FIG. 4 by removable storage 418 and non-removable storage 420. The removable storage 418 and non-removable storage 420 can store some, or all, of the functions 404, 406, 408, 410.

Non-transitory computer-readable media may include volatile and nonvolatile, removable and non-removable tangible, physical media implemented in technology for storage of information, such as computer readable instructions, data structures, program modules, or other data. The memory 402, removable storage 418, and non-removable storage 420 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 102. Any such non-transitory computer-readable media may be part of the UEs 102 or may be a separate database, databank, remote server, or cloud-based server.

In some implementations, the transceiver(s) 422 include any sort of transceivers known in the art. In some examples, the transceiver(s) 422 can include wireless modem(s) to facilitate wireless connectivity with the other UEs, the Internet, and/or an intranet via a cellular connection. Further, the transceiver(s) 422 may include a radio transceiver that performs the function of transmitting and receiving radio frequency communications via an antenna (e.g., Wi-Fi or Bluetooth®). In other examples, the transceiver(s) 422 may include wired communication components, such as a wired modem or Ethernet port, for communicating with the other UEs or the provider's Internet-based network.

In some implementations, the output device(s) 424 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 102 is connected to a network, the type of call being received (e.g., video calls vs. voice calls), the number of active calls, etc. Output device(s) 424 also include ports for one or more peripheral devices, such as headphones, peripheral speakers, or a peripheral display.

In various implementations, input device(s) 426 include any sort of input devices known in the art. For example, the input device(s) 426 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
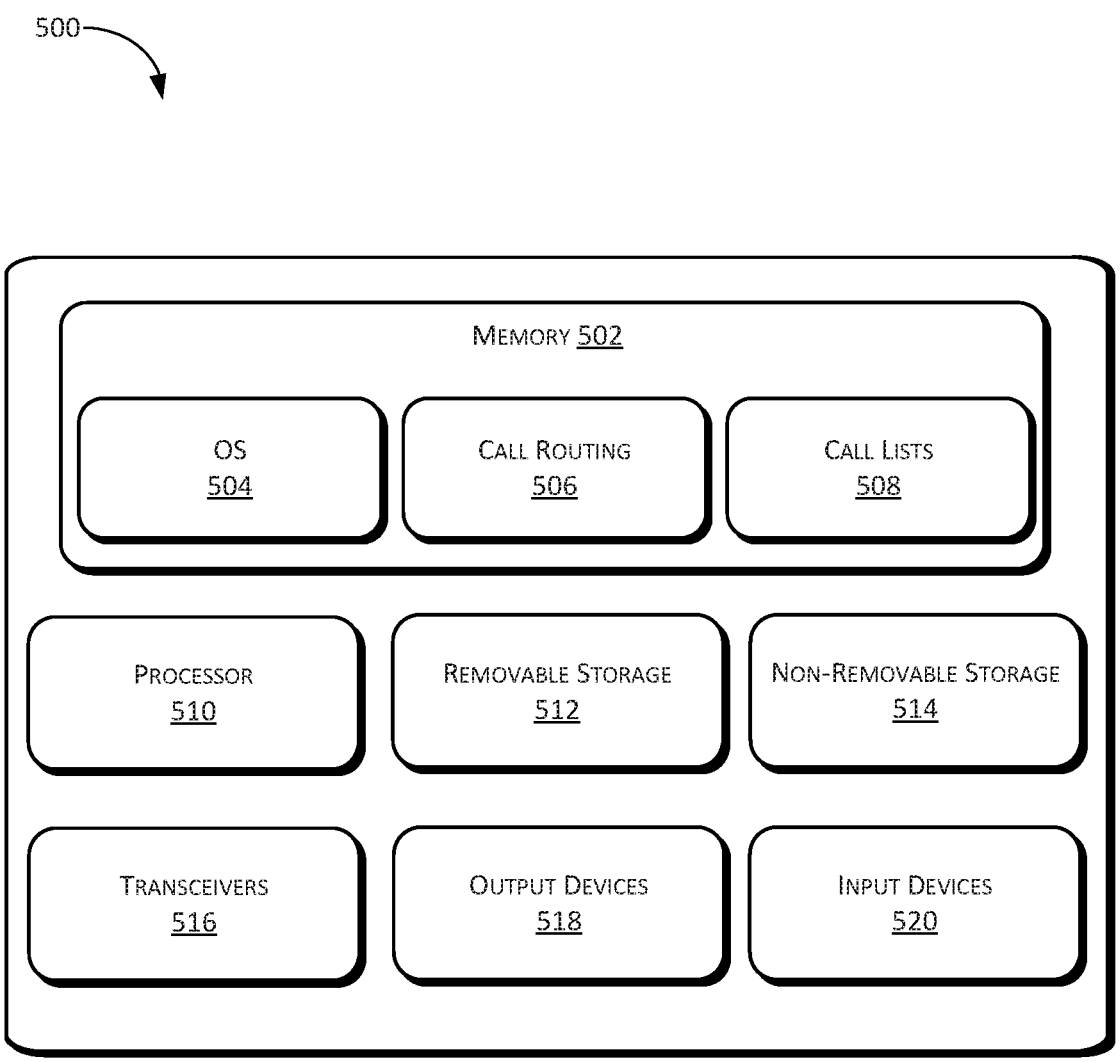
FIG. 5 is an example of a network server for use with the systems and methods disclosed herein, in accordance with some examples of the present disclosure.

As shown in FIG. 5, the system 100 and methods 200, 300 can also be used in conjunction with a network entity, or server 500, of the IMS 104, which can comprise a variety of electronic devices. As mentioned above, this server 500 can comprise a TAS, 3GPP AAA server, HLN, HSS, or another server or component associated with the IMS 104.

The server 500 can comprise a number of components to execute the above-mentioned functions and apps. As discussed below, the server 500 can comprise memory 502 including many common features such as, for example, the OS 504, call routing module 506, and one or more call lists 508.

The server 500 can also comprise one or more processors 510. In some implementations, the processor(s) 510 can be a central processing unit (CPU), a graphics processing unit (GPU), or both CPU and GPU, or any other sort of processing unit. The server 500 can also include one or more of removable storage 512, non-removable storage 514, transceiver(s) 516, output device(s) 518, and input device(s) 520.

In various implementations, the memory 502 can be volatile (such as random access memory (RAM)), non-volatile (such as read only memory (ROM), flash memory, etc.), or some combination of the two. The memory 502 can include all, or part, of the functions 506, 508 for the server 500, among other things. The memory 502 can also include the OS 504. Of course, the OS 504 varies depending on the manufacturer of the server 500 and the type of component. Many servers, for example, run Linux or Windows Server. Dedicated cellular routing servers may run specific telecommunications OS 504. The OS 504 contains the modules and software that supports a computer's basic functions, such as scheduling tasks, executing applications, and controlling peripherals.

In some examples, depending in the server's function, the server 500 can also comprise a call routing module 506. The server 500 can comprise an MSC 618 (discussed below), for example, responsible for routing voice calls from one UE 102 to another or to a landline. Regardless, the server 500 can route calls through the IMS 104 to their destination. In some examples, the call routing module 506 can also work in concert with the call lists 508 to affect proper call handling when a user is on an emergency call.

In some examples, the server 500 can also comprise one or more call lists 508. As mentioned above, the enhanced e911 call handling can be handled on the UE 102 or on the IMS 104 (i.e., the network side). In the case of network implementation, the server 500 can determine whether the user is on a 911 call. If, during the 911 call, the user receives a second call, the server 500 can consult the call lists 508 to determine whether a caller is on a list associated with enhanced e911 call handling. If the caller is a PSAP, for example, or a "VIP," then the caller can be sent through to the UE 102 to activate call-waiting, as discussed above. If the caller is a "general" caller, on the other hand, the caller can simply be sent to voicemail as normal.

The server 500 may also include additional data storage devices (removable and/or non-removable) such as, for example, magnetic disks, optical disks, or tape. Such additional storage is illustrated in FIG. 5 by removable storage 512 and non-removable storage 514. The removable storage 512 and non-removable storage 514 can store some, or all, of the OS 504 and functions 506, 508.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500 or may be a separate database, databank, remote server, or cloud-based server.

In some implementations, the transceiver(s) 516 include any sort of transceivers known in the art. In some examples, the transceiver(s) 516 can include wireless modem(s) to facilitate wireless connectivity with the other UEs, the Internet, and/or an intranet via a cellular connection. Further, the transceiver(s) 516 may include a radio transceiver that performs the function of transmitting and receiving radio frequency communications via an antenna (e.g., Wi-Fi or Bluetooth®). In other examples, the transceiver(s) 516 may include wired communication components, such as a wired modem or Ethernet port, for communicating with the other UEs or the provider's Internet-based network.

In some implementations, the output device(s) 518 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 500 is connected to a network, the type of call being received (e.g., video calls vs. voice calls), the number of active calls, etc. Output device(s) 518 also include ports for one or more peripheral devices, such as headphones, peripheral speakers, or a peripheral display.

In various implementations, input device(s) 520 include any sort of input devices known in the art. For example, the input device(s) 520 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
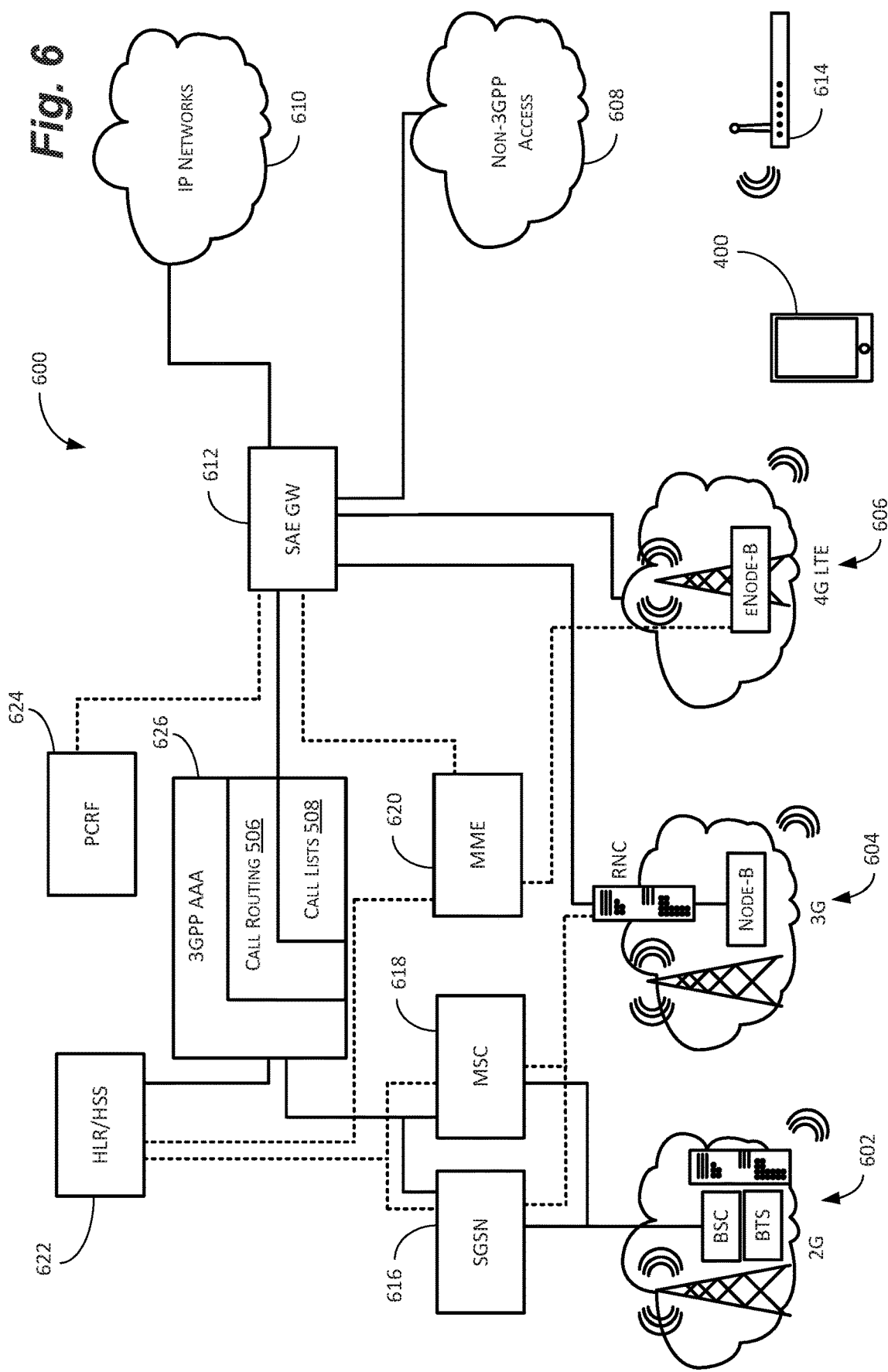
FIG. 6 is an example of a cellular and internet protocol network for use with the systems and methods disclosed herein, in accordance with some examples of the present disclosure.

FIG. 6 depicts a conventional cellular network 600 including 2G 602, 3G 604, and 4G long-term evolution (LTE) 606 components. Of course, future technologies, such as, for example, 5G and device-to-device (D2D) components could also be included and are contemplated herein. As mentioned above, many of the "back-end" components of the network 600 could handle some, or all, of the system 100 and methods 200, 300 associated with enhanced e911 call handling. Indeed, some, or all, of the aforementioned call routing module 506 and call lists 508 components could be located on one or more of, for example, the HLR/HSS 622, the 3GPP AAA server 626, or other components.

As is known in the art, data can be routed from the Internet or other sources using a circuit switched modem connection (or non-3GPP connection) 608, which provides relatively low data rates, or via IP based packet switched 610 connections, which results is higher bandwidth. The LTE system 606, which is purely IP based, essentially "flattens" the architecture, with data going straight from the internet to the service architecture evolution gateway (SAE GW) 612 to evolved Node B transceivers 606, enabling higher throughput. Many UEs 102 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the network 600 e.g. the mobility management and authentication of the users. The MSC 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 620 is the key control-node for the 4G LTE network 606. It is responsible for idle mode UE 102 paging and tagging procedures including retransmissions. The MME 620 is involved in the bearer activation/deactivation process and is also responsible for choosing the SAE GW 612 for the UE 102 at the initial attach and at time of intra-LTE handover involving Core Network (CN) node relocation (i.e., switching from one cell tower to the next when traveling). The MME 620 is responsible for authenticating the user (by interacting with the HSS 622 discussed below). The Non-Access Stratum (NAS) signaling terminates at the MME 620 and it is also responsible for generation and allocation of temporary identities to UE 102. The MME 620 also checks the authorization of the UE 102 to camp on the service provider's HPLMN or VPLMN and enforces UE 102 roaming restrictions on the VPLMN. The MME 620 is the termination point in the network for ciphering/integrity protection for NAS signaling and handles the security key management. The MME 620 also provides the control plane function for mobility between LTE 606 and 2G 602/3G 604 access networks with the S3 interface terminating at the MME 620 from the SGSN 616. The MME 620 also terminates the S6a interface towards the home HSS 622 for roaming UEs 102.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules unction (PCRF) 624 is a software node that determines policy rules in the network 600. The PCRF 624 is generally operates at the network core and accesses subscriber databases (e.g., the HSS/HLR 622) and other specialized functions, such as enhanced e911 call handling, in a centralized manner. The PCRF 624 is the main part of the network 600 that aggregates information to and from the network 600 and other sources (e.g., IP networks 610). The PCRF 624 can support the creation of rules and then can automatically make policy decisions for each subscriber active on the network 600. The PCRF 624 can also be integrated with different platforms like billing, rating, charging, and subscriber database or can also be deployed as a standalone entity.

Finally, the 3GPP AAA server 626 performs authentication, authorization, and accounting (AAA) functions and may also act as an AAA proxy server. For WLAN 614 access to (3GPP) IP networks 610 the 3GPP AAA Server 626 provides authorization, policy enforcement, and routing information to various WLAN components. The 3GPP AAA Server 626 can generate and report charging/accounting information, performs offline charging control for the WLAN 614, and perform various protocol conversions when necessary.

As shown, in some examples, the 3GPP AAA server 626 can contain some, or all, of the components of the enhanced e911 call handling. Of course, as mentioned above, other components (e.g., the HSS/HLR 622) could also include some, or all, of the enhanced e911 call handling.

Figure 7:
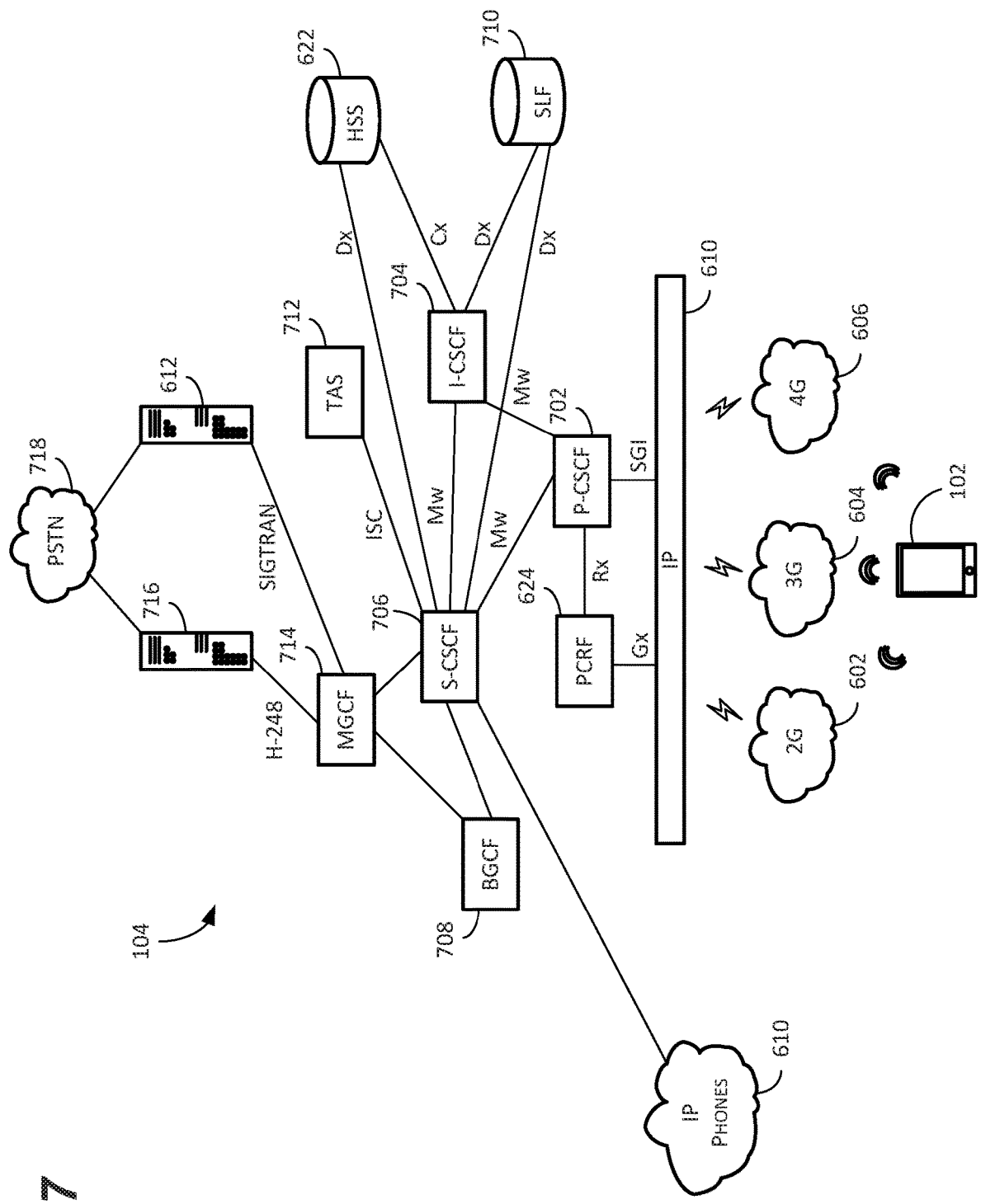
FIG. 7 is an example of an Internet Protocol Multimedia Core Network Subsystem ("IMS") for use with the systems and methods disclosed herein, in accordance with some examples of the present disclosure.

FIG. 7 includes a more detailed view of the components of the IMS 104. As shown, the IMS 104 includes a number of network components for routing signals, storing subscriber information, and connecting across various subsystems and network types. As discussed above, the IMS 104 is built on SIP as the base to further support packaging of voice, video, data, fixed, and mobile services on a single platform to end users. It enables communications across multiple types of networks, including cellular, satellite, broadband, cable, and fixed networks, and enables the creation an efficient interoperating networks.

As mentioned above, the IMS 104 provides interoperability for UEs 102 and other devices across multiple platforms including, for example, 2G 602, 3G 604, 4G 606, IP 610 networks. The IMS 104 also includes some components already discussed in the more general FIG. 6. These include, for example, the PCRF 624, HSS 622 and SAE GW 612.

The IMS 104 also includes, however, a proxy-call session control function (P-CSCF) 702. The P-CSCF 702 is the entry point to the IMS 104 and serves as the outbound proxy server for the UE 102. The UE 102 attaches to the P-CSCF 702 prior to performing IMS registrations and initiating SIP sessions. The P-CSCF 702 may be in the home domain of the IMS operator, or it may be in the visiting domain, where the UE 102 is currently roaming. For attachment to a given P-CSCF 702, the UE performs P-CSCF 702 discovery procedures. Attachment to the P-CSCF 702 enables the UE 102 to initiate registrations and sessions with the IMS 104.

The IMS 104 also includes an interrogating-call session control function (I-CSCF) 704. The I-CSCF 704 acts as an inbound SIP proxy server in the IMS 104. During IMS registrations, the I-CSCF 704 queries the HSS 622 to select the appropriate S-CSCF 706 (discussed below) which can serve the UE 102. During IMS 104 sessions, the I-CSCF 704 acts as the entry point to terminating session requests. The I-CSCF 704 routes the incoming session requests to the S-CSCF 706 of the called party.

The IMS 104 also includes a serving-call session control function (S-CSCF) 706. The S-CSCF 706 acts as a registrar server, and in some cases as a redirect server. The S-CSCF 706 facilitates the routing path for mobile originated or mobile terminated session requests. The S-CSCF 706 also interacts with various components for playing tones and announcements, among other things.

The IMS 104 also includes a breakout gateway control function (BGCF) 708. The BGCF 708 is the IMS 104 element that selects the network in which PSTN 718 (discussed below) breakout is to occur. If the breakout is to occur in the same network as the BGCF 708, for example, then the BGCF 708 selects a Media Gateway Control Function (MGCF) 714 (also discussed below) that will be responsible for interworking with the PSTN 718. The MGCF 714 then receives the SIP signaling from the BGCF 708.

The IMS 104 also includes a subscriber location function (SLF) 710. The SLF 710 provides information about the HSS 622 that is associated with a particular user profile. It is generally implemented using a database. If the IMS 104 contains more than one HSS 622, I-CSCF 704 and S-CSCF 706 will communicate with SLF 710 to locate the appropriate HSS 622 based on the user profile.

The IMS 104 also includes the aforementioned TAS 712. As the name implies, the TAS 712, sometimes known in a telephony context only as an application server (AS), is a component used to provide telephony applications and additional multimedia functions. The TAS 712 can include any entity in a telephone network that carries out functions that are not directly related to the routing of messages through the network. Such functions can include, for example, in-network answering machines, automatic call forwarding, conference bridges and other types of applications, including the systems 100 and methods 200, 300, 400 discussed herein.

The IMS 104 also includes a media gateway controller function (MGCF) 714. The MGCF 714 is a SIP endpoint that handles call control protocol conversion between SIP and ISDN user part (ISUP)/Bearer-Independent Call Control (BICC) and interfaces with the SAE GW 612 over Stream Control Transmission Protocol (SCTP). The MGCF 714 also controls the resources in a Media Gateway (MGW) 716 across an H.248 interface (discussed below).

The IMS 104 also includes a (MGW) 716. The MGW 716 is a translation device or service that converts media streams between disparate telecommunications technologies such as POTS, SS7, Next Generation Networks (2G 602, 3G 604, and 4G 606) or private branch exchange (PBX) systems.

Finally, the IMS 104 also includes a public switched telephone network (PSTN) 718. The PSTN 718 is the world's collection of interconnected voice-oriented public telephone networks, both commercial and government-owned. It's also referred to as the Plain Old Telephone Service (POTS). With respect to IP phones 610, for example, the PSTN 718 actually furnishes much of the Internet's long-distance infrastructure. Because Internet service providers (ISPs) pay the long-distance providers for access to their infrastructure and share the circuits among many users through packet-switching (discussed above), Internet users avoid having to pay usage tolls to anyone other than their ISPs.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the UE 102 and/or various components on the IMS 104, other components could perform the same or similar functions without departing from the spirit of the invention.

The specific configurations, machines, and the size and shape of various elements can be varied according to particular design specifications or constraints requiring a UE 102, server 500, system 100, or method 200, 300 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   determining, by a first user equipment (UE), that the first UE initiated an emergency call with a public safety answering point (PSAP) and is engaged in the emergency call;
   in response to determining that the first UE initiated and is engaged in the emergency call with the PSAP, disabling, by the first UE, call-waiting during the emergency call to set a default response of sending incoming calls received by the first UE directly to voicemail while the first UE is engaged in the emergency call;
   receiving, by the first UE, an incoming call from a second UE while the first UE is engaged in the emergency call with the PSAP;
   determining, by the first UE, that a number associated with the second UE is included in a list of preferred numbers stored in a memory of the first UE; and
   activating, by the first UE, call-waiting to override the default response for the incoming call during the emergency call based on determining that the number associated with the second UE is included in the list of preferred numbers.

2. The method of claim 1, wherein the list of preferred numbers includes numbers associated with the PSAP.

3. The method of claim 1, wherein the list of preferred numbers is different than a general caller list stored in the memory, and wherein the first UE is configured to send other incoming calls from numbers on the general caller list that are received during the emergency call directly to voicemail according to the default response.

4. The method of claim 1, wherein the list of preferred numbers is one of a favorites list or a very important person (VIP) list.

5. The method of claim 1, wherein determining, by the first UE, that the first UE initiated the emergency call with the PSAP comprises receiving, by a processor of the first UE, a signal from a dialer on the first UE that a user has dialed 911 or another emergency number associated with the PSAP.

6. A method comprising:
   determining, by a network entity associated with a telecommunications network, that a first user equipment (UE) initiated an emergency call with a public safety answering point (PSAP) and is engaged in the emergency call;
   in response to determining that the UE initiated and is engaged in the emergency call with the PSAP, disabling, by the network entity, call-waiting for the first UE during the emergency call to set a default response of sending incoming calls received for the first UE directly to voicemail while the first UE is engaged in the emergency call;
   receiving, by the network entity, an incoming call for the first UE from a second UE while the first UE is engaged in the emergency call with the PSAP;
   determining, by the network entity, that a number associated with the second UE is included in a list of preferred numbers stored in a memory of the network entity;
   activating, by the network entity, call-waiting for the first UE to override the default response for the incoming call during the emergency call based on determining that the number associated with the second UE is included in the list of preferred numbers; and
   sending, by the network entity, the incoming call to the first UE during the emergency call following activation of call-waiting for the first UE.

7. The method of claim 6, wherein the list of preferred numbers includes numbers associated with the PSAP.

8. The method of claim 6, wherein the list of preferred numbers is different than a general caller list associated with the first UE, and wherein the network entity is configured to send other incoming calls from numbers on the general caller list that are received for the first UE during the emergency call directly to voicemail according to the default response.

9. The method of claim 6, wherein the list of preferred numbers is one of a favorites list or a very important person (VIP) list associated with the first UE.

10. The method of claim 6, wherein determining, by the network entity, that the first UE initiated and is engaged in the emergency call with the PSAP comprises receiving, by the network entity, a session initiation protocol (SIP) message from the first UE including a response code indicating the first UE is engaged in a 911 call or a call associated with another emergency number.

11. The method of claim 6, wherein the network entity comprises a telephony application server (TAS).

12. A first user equipment (UE) comprising:
one or more transceivers to send and receive one or more wireless transmissions;
one or more processors in communication with at least the one or more transceivers; and
memory storing a call-handling application that, when executed, causes the one or more processors to:
determine that the one or more transceivers initiated an emergency call with a public safety answering point (PSAP) and are engaged in the emergency call;
in response to determining that the one or more transceivers initiated and are engaged in the emergency call with the PSAP, disable call-waiting during the emergency call to set a default response of sending incoming calls received by the one or more transceivers directly to voicemail while the one or more transceivers are engaged in the emergency call;
detect receipt, by the one or more transceivers, of an incoming call from a second UE while the one or more transceivers are engaged in the emergency call with the PSAP;
determine that a number associated with the second UE is included in a list of preferred numbers stored in the memory; and
activate call-waiting to override the default response for the incoming call during the emergency call based on determining that the number associated with the second UE is included in the list of preferred numbers.

13. The first UE of claim 12, wherein the list of preferred numbers includes numbers associated with the PSAP.

14. The first UE of claim 12, wherein the list of preferred numbers is different than a general caller list stored in the memory, and wherein the call call-handling application is configured to send other incoming calls from numbers on the general call list that are received during the emergency call directly to voicemail according to the default response.

15. The first UE of claim 12, wherein the list of preferred numbers is one of a favorites list or a very important person (VIP) list.

16. The first UE of claim 15, wherein the VIP list includes at least one health care professional associated with a user of the first UE.

17. The first UE of claim 12, wherein the call-handling application further causes the one or more processors to:
receive, via one or more input devices of the first UE, an input from a user rejecting the incoming call; and
send, with the one or more processors, the incoming call to voicemail.

18. The first UE of claim 12, wherein the preferred list includes at least a last outgoing number dialed by the first UE prior to the first UE engaging in the emergency call with the PSAP.

19. The method of claim 1, wherein the preferred list includes at least a last outgoing number dialed by the first UE prior to the first UE engaging in the emergency call with the PSAP.

20. The method of claim 6, wherein the preferred list includes at least a last outgoing number dialed by the first UE prior to the first UE engaging in the emergency call with the PSAP.

* * * * *